UNITED STATES PATENT OFFICE 2,464,207

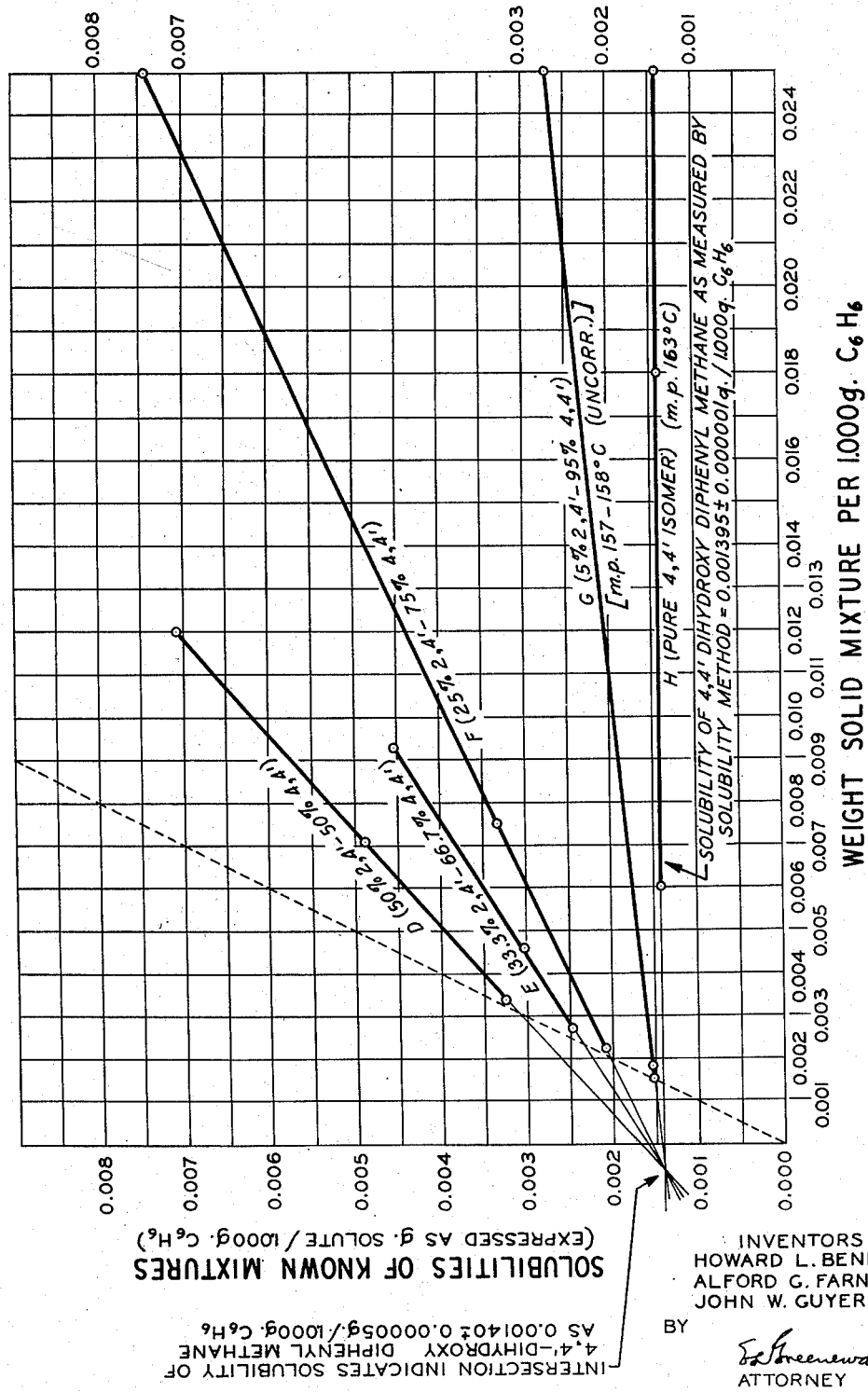

CRYSTALLINE DIHYDROXY PHENOLS

Howard L. Bender, Alford G. Farnham, and John W. Guyer, Bloomfield, N. J., assignors to Bakelite Corporation, a corporation of New Jersey Application March 24, 1944, Serial No. 527,988

8 Claims. (Cl. 260—619)

This invention comprises the phenols or crystalline hydroxy-hydroxy'-diphenyl-methanes and related compounds, and of interest because of their resin-forming properties. Of the six isomeric methanes, Beilstein (VI, 994–999) gives methods for the preparation of the 2,4', the 3,3' and the 4,4'; for the 2,2' only brominated and nitrated compounds are listed, and there are no references of any kind to the 2,3' and the 3,4' isomers. The 2,4' compound is described as obtained in the form of needles melting at 117°–118° C., and the 4,4' compound is said to occur in the form of plates or needles with a melting point of 158° C. Apart from Beilstein, there are records of attempts at producing the 2,2' compound that express the conclusion that the compound cannot exist as such but only in the form of xanthene because of the elimination of water between the hydroxyl groups (J. S. C. Ind., 49, 252; 58, 317T).

It has now been found that the literature references are incorrect, both as to the production hitherto of pure isomers of the 2,4' and 4,4' type and as to the inability of producing the 2,2' type of isomer. What is more, all six dihydroxy diphenyl-methanes (including the 2,3' and the 3,4' isomers not mentioned by Beilstein) have now been isolated as pure crystals with melting points as follows:

| Isomer | Structure | M.P. |
|---|---|---|
| 2,2'- | HO–C₆H₄–CH₂–C₆H₄–OH | 118.5°–119.5° C. |
| 2,3'- | HO–C₆H₄–CH₂–C₆H₄–OH | 95.5°–96° C. |
| 2,4'- | HO–C₆H₄–CH₂–C₆H₄–OH | 119°–120° C. |
| 3,3'- | HO–C₆H₄–CH₂–C₆H₄–OH | 102°–103° C. |
| 3,4'- | HO–C₆H₄–CH₂–C₆H₄–OH | 116°–116.5° C. |
| 4,4'- | HO–C₆H₄–CH₂–C₆H₄–OH | 162°–163° C. |

By the foregoing terminology it is to be understood that 2 designates an ortho position on one ring and 2' the ortho position on the other ring of the diphenyl methane; 2 and 2' are therefore also inclusive of 6 and 6'. Likewise 3 and 3' designate the meta positions on the respective rings and include 5 and 5'; and 4 and 4' designate the para positions. On any additional rings the ortho, meta and para positions are indicated by 2", 3" and 4", etc., and this terminology is extended to condensed chains having multiple points of connection per ring. The positions are graphically represented as follows:

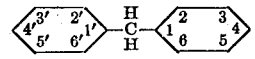

The six isomers, here under consideration as phenols and that can be reacted further to form resins, are basically two ring compounds, but by reaction with formaldehyde or equivalent they produce intermediates consisting of chains of 4, 6, 8 or any multiple of the two rings, and these chains can be cross-linked by a hardening agent to give the infusible or heat-hardened resins; chains can also be produced with an odd number of rings by including phenol, monohydroxy benzene, as a reactant. When in the reaction formaldehyde is replaced by other carbonyl organic compounds selected from the class consisting of aldehydes and ketones and derivatives engendering them, such as acetaldehyde, benzaldehyde, acetone, hexamethylenetetramine, etc., the aldehydes and ketones result in corresponding changes in the methylene groups providing the methylene chain linkages; substituted phenols provide corresponding substitutions on the phenyl rings of the chain. These substitution products and derivatives are herein included as diphenylolmethanes.

The reaction data indicate that the six methanes here under consideration fall into two groups: group I including the 2,2', 2,4' and the 4,4' isomers, and group II the 2,3', 3,3' and 3,4' isomers.

In the reaction of phenol with formaldehyde, the substitution tends to go first to the ortho position on the phenol ring to form a methylol group which in turn reacts with a second phenol to give the diphenylol-methane; the next positions on the ring in the order of reactivity are the para and the remaining ortho positions. The isomers of group I accordingly can form by the direct reaction of phenol and formaldehyde under proper reacting conditions, and these methanes in turn can react with more formaldehyde, or with the splitting off of water can react with formaldehyde and any other phenol, to produce resins consisting of multiple ortho- or para-methylene-chained phenols. In such resin chains, the open positions (of the three reactive positions ortho, ortho and para to the hydroxyl) are generally ortho and occasionally para, and these are available for cross-linkage between chains to produce the heat-reactive or hardening resins. The 4,4' isomers when united by formaldehyde seem to fit particularly well into a chain formation, due to the hydrogen-bonding energy (:) of the hydroxyl groups, to leave only ortho (o) positions open as expressed by the structural formula for a chain:

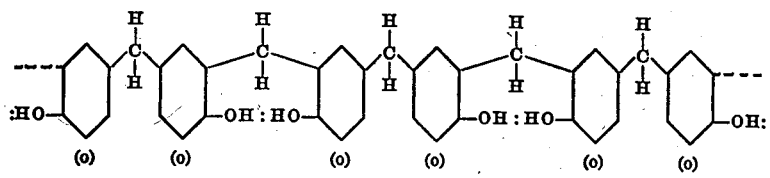

The 2,4' isomer cannot hydrogen-bond as well as the 4,4' and on test it was found to be slower in reaction with formaldehyde; it is indicated by the structural chain formula:

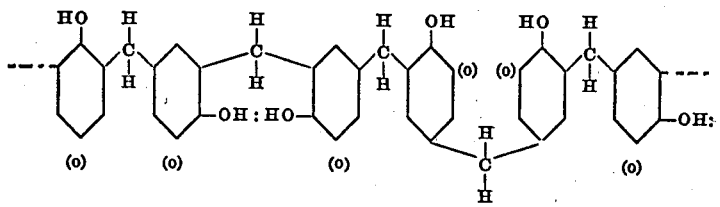

The 2,2' isomer when united by formaldehyde shows a still more difficult condition for forming hydrogen-bonded rings; but it does leave the more active para (p) positions open to give it increased speed of cross-bonding reaction, as shown by the structural chain formula:

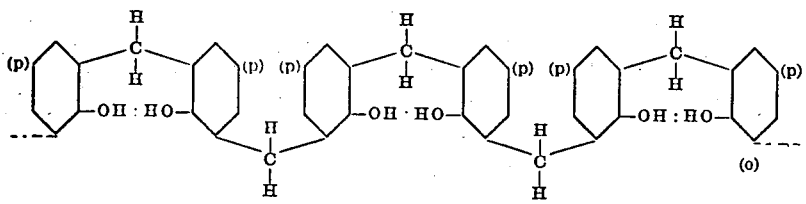 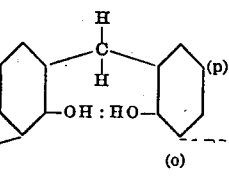

The reaction speeds of the pure isomers with 15 per cent by weight of hexamethylenetetramine at 160° C. to the infusible gel stage have been determined as follows: 2,4' isomer, 240 seconds; 4,4' isomer, 175 seconds; 2,2' isomer, 60 seconds. The facts accordingly appear to support the ortho, para and hydrogen-bonding theory explained in the foregoing.

The addition of methylene to the hydroxyphenyl ring at an ortho or para position, however, reduces the reactivity to a corresponding extent, and in this respect the group II methanes essentially differ from the group I methanes. So far, the group II methanes (2,3'; 3,3'; 3,4') have only been made by indirect methods (as distinguished from the direct reaction of phenol and formaldehyde), because conditions are as yet not known under which the methylene will directly unite in the meta positions. Group II methanes are particularly differentiated in that substitution in the meta position results in a methane as reactive or more so than phenol itself; for instance phenol reacts with 15% by weight of hexamethylenetetramine at 160° C. to an infusible gel in 165 seconds, but with the same molar methylene ratio the 3,3' isomer reacts in 120 seconds, the 2,3' in 140 seconds, and the 3,4' isomer in 130 seconds to infusible gels. As the meta substitution leaves open in each ring of the diphenylol methane the three reactive ortho, ortho and para positions in the isomers, the isomers of group II are desirable, even though difficult to manufacture and expensive, for rapid-reacting and high cross-linking resin chains as evidenced by the structural formula:

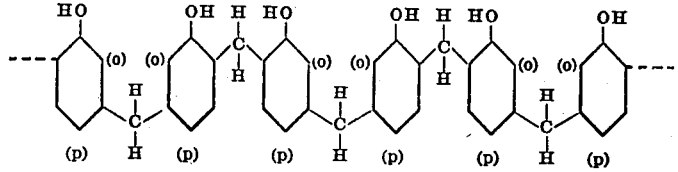

It can be appreciated from this that even an occasional residue of the meta structure in a mixture adds materially to the cross-bonding reactivity of the composition; in comparison with a group I isomer, the meta structure has twice the number of reactive positions available.

With respect to the reaction speeds with 15% of hexamethylenetetramine given in the foregoing, it is to be observed that the isomers, with the exception of the 2,2' isomer, fall into a definite pattern:

2,4' isomer—240 seconds
4,4' isomer—175 seconds
2,3' isomer—140 seconds
3,4' isomer—130 seconds
3,3' isomer—120 seconds The 2,2' is, however, an outstanding exception with a speed of 60 seconds, and this is of importance since its inclusion in a composition offers a means for controlling or accelerating hardening speeds of other isomers or resins. In a further respect it differs most markedly in that the isomer in the infusible state is flexible and elastic in the film form on tin plate; this property is believed to be actual bromine values for the dihydroxy-diphenyl-methanes, and from these were calculated the bromine value per hydroxy-phenyl ring by subtracting the methylene value and dividing by two. The actual determinations and calculated values are given in the following table:

| Substance | Substituted rings | Determined per mol | Calculated per | | | |
|---|---|---|---|---|---|---|
| | | | $CH_2$ | phenyl | o-OH-phenyl | p-OH-phenyl |
| Benzene | 0 | 0.18 | 0 | 0 | 0 | 0 |
| Phenol | 1 | 4.65 | 0 | 4.65 | 0 | 0 |
| Diphenyl | 2 | 1.09 | 0 | 0.545 | 0 | 0 |
| Diphenyl-methane | 2 | 2.13 | 1.04 | 0.545 | 0 | 0 |
| 2-monohydroxy-diphenyl-methane | 2 | 4.71 | 1.04 | 0.545 | 3.125 | 0 |
| 4,4'-dihydroxy-diphenyl-methane | 2 | 10.11 | 1.04 | 0 | 0 | 4.54 |
| 2,4'-dihydroxy-diphenyl-methane | 2 | 8.64 | 1.04 | 0 | 3.125 | 4.54 |
| 2,2'-dihydroxy-diphenyl-methane | 2 | 6.40 | 0.15* | 0 | 3.125 | 0 | due to a lesser number of cross linkages taking place in the hardening or setting up of the isomer.

Characteristic of both groups of methanes is their crystalline structure which permits purification in a conventional manner, such as distillation, crystallization from solvents, etc. and thereby obtained free from all traces of unreacted phenols, formaldehyde, catalysts, by-products, etc. This is an advantage of utmost importance in the phenolic resin field, for it has been the reactants and by-products remaining in the resinous form of reaction products that have been found to be the sources of difficulty in controlling the resin properties and in avoiding discoloration and the like; yet the purified products are found to be fully reactive with hardening agents like hexamethylenetetramine.

The properties obtained for the crystalline derivatives of these isomeric materials were compared with the chemical literature, and mixed melting points were made with authentic standards where possible. Derivatives made and proven with their melting points are as follows:

The value for the para-hydroxy ring was calculated by subtracting the $CH_2$ value and dividing by two. From the calculated values for the 2,4' methane, the bromine value per mol is 8.70 which agrees very closely with the actual determination. The methylene value (*) for the 2,2' isomer, however, reduces to 0.15 in order to make the calculated values (obtained from the bromine values of the other compounds) agree with the actually observed value of 6.40; there is an explanation for this on the hydrogen-bonding theory.

The 2,2' isomer as such can exist in the two forms:

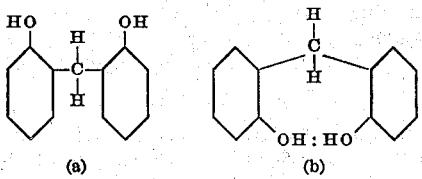

(a)　　(b)

The form (b) having hydrogen-bonding favors increased reaction rate with formaldehyde to

| Isomer | Diacetate | Dimethyl ether | Diethyl ether | Dibenzyl ether | Bromo | Dipropionate | Aryldiacetic Acid |
|---|---|---|---|---|---|---|---|
| 4,4' | 73-74 | 51-52 | 35-36 | 110-111 | 224-227 | 80-82 | 200-202 |
| 2,4' | 72-73.5 | 26-28 | 62-63 | 75-77 | 198-199 | Liquid | 171-173 |
| 2,2' | 47-47.5 | 62-64 | 84-85 | 62-68 | 202-204 | Liquid | 193-194 |
| 3,3' | 57.5-58.5 | | | | | | |
| 3,4' | 66-67 | | | | | | 185-186 |
| 2,3' | 43-44 | | | | | | |

These derivatives were instrumental in checking the structural formulae assigned to the isomers.

PROOF OF STRUCTURAL FORMULAE

In addition to the preparation of derivatives of known constitution that serve as checks, the positions of the hydroxyls on the phenyl rings of the crystalline isomers of group I were determined by reacting the selected isomer with potassium bromide-bromate under conditions leading to the substitution of 5 bromine atoms on a ring. These conditions were obtained by reacting phenol with an excess of potassium bromide-bromate for two hours at 50° C., and it was found the phenol united with 4.65 bromine atoms. Pure reference materials—benzene, diphenyl, diphenyl methane and ortho-hydroxy-diphenyl-methane—were available and were used to establish bromine values for the phenyl ring, the bonding methylene, and the ortho-monohydroxy-phenyl ring under the conditions established for phenol. There were then obtained under these conditions the form chains, but the bonding interferes with the bromination of the methylene group; chaining of the 2,2' isomer cannot further influence this factor, since the isomer itself has all its possible hydrogen bonding. In comparison the 4,4' isomer in itself presents no possibility of hydrogen bonding, and it is therefore active to bromine; the chaining of the 4,4' isomer, however, causes hydrogen-bonding and so a great reduction in bromine activity.

To demonstrate the foregoing and avoid cross-linking, a fusible resin chain of average low molecular weight (636) was made from the 2,2' isomer and a similar resin (molecular weight 627) was made from the 4,4' isomer by reaction with formaldehyde. From the preceding table, if there is no hydrogen-bonding, no added methylenes or cross-linking, the calculated bromine value for the 2,2' chain per phenyl ring and connecting methylene is $$3.125 + \frac{1.04}{2} - 1 \text{ or } 2.645$$

(in the average chain formation there is one methylene added for every two rings and the chain formation removes one position on the ring for bromination); for the 4,4' chain, the calculated value is $$4.54 + \frac{1.04}{2} - 1 \text{ or } 4.06$$

The actual determined value for the 2,2' resin chain was 16.17 per mol or 2.69 per ring plus methylene, and that determined for the 4,4' resin chain was 18.25 per mol or 3.04 per ring plus methylene. The value of 2.69 for a ring of the 2,2' resin chain agrees closely with the calculated value of 2.645, but that of 3.04 for a ring of the 4,4' resin chain is a decided departure from the calculated value of 4.06. In the latter case there was evidently a disturbance herein called hydrogen-bonding.

Whatever the theory, however, the findings that products permitting hydrogen-bonding have an accelerated rate of reaction with hardener and a retarded rate of bromination is of practical importance in controlling resin reactions. In this connection it has been found that high cross-linking speed begins for resins that test at a bromination value of about 2.85 atoms per ring or approximately 2.23 grams of bromine added to each gram of resin, and that the reaction speed increases as the bromination values become less. It has also been discovered that the high cross-linking speeds are largely independent of the resin chain lengths; resins are thus obtainable that can pass from a very fluid or high flow condition to infusible gels in a minute or less at 160° C.

PURITY DETERMINATION

The purity of the isomers obtained was determined by a method dependent upon solubility values and is illustrated in the accompanying drawing by a graph showing a series of straight line curves plotted from data obtained by the method.

The procedure followed was that of adding a sample in excess of the amount going into solution to benzene or other suitable solvent until saturated at a slightly elevated temperature and then allowing the solution to come to equilibrium at 25° C. (±0.1° C.). A portion was filtered free of excess solid and the amount in solution determined. For any one impure sample an increased solubility was found to lie on a straight line curve obtained by plotting the solubilities for different amounts of excess. For compositions known to contain only two isomers but in varying proportions, the plotting of the solubilities gave a series of curves but all intersecting at one point; the intersection was the value of the solubility of the major component. A pure material gives the same solubility value for varying amounts of excess.

As an illustration the test for purity was applied to known mixtures of the 4,4' isomer with minor percentages of the 2,4' isomer. As shown by the plotted curves of the drawing, almost 0.0035 gram of a 50–50 mixture went into solution per each gram of benzene, the solubility measure with that amount being 0.00325 gram; increasing the solids added to 0.007 gram, however, gave an increased solubility of about 0.0049 gram and a further increase to 0.012 gram indicated a solubility of over 0.007 gram. The solubility determinations were repeated for a mixture of 66.7% of 4,4' and 33.3% of 2,4'; a mixture of 75% 4,4' and 25% 2,4'; and mixture of 95% 4,4' and 5% 2,4'. In each case a straight line curve was obtained, and it is to be observed that these lines intersect at a common point. When the pure 4,4' was isolated, different excess amounts of solute gave the same solubility value of 0.001395±0.000001 gram per each gram of benzene; the straight line curve passed through the intersection of the other curves indicating a solubility of 0.00140±0.00005 gram per each gram of benzene. The pure product then is known when the solubility remains the same for varying amounts of excess, and this value corresponds to the intersection of the straight line curves obtained from admixtures with an impurity. The corrected melting point of the pure 4,4' product was found to be 162.26° C., and the mixture containing 5% of 2,4' had a melting point of 157°–158° C. or that heretofore assigned to the pure 4,4' isomer.

GROUP I ISOMERS

4,4'-dihydroxy-diphenyl-methane

The discovery made with regard to the impurity of the 4,4' isomer as described in the literature is most surprising, for the isomer with a melting point of 158° C. has been accepted as the pure 4,4' standard for many years and repeatedly confirmed by many workers in the field .(Beilstein, 6, 995; Zincke, Ann., 302, 237 (1898); Lunjac, Chem. Centr., 1, 1650 (1905); Baekeland, Ind. & Eng. Chem., 1, 149 (1909); Traubenburg, Z., angew, Chem., 36, 515 (1923); Harden and Reid, J. A. C. S., 54, 4325 (1932); Chem. Rubber Handbook, 26th ed., 847 (1942)). The discovery came about in connection with the preparation of the 4,4' crystals for use as standards and obtained from diphenyl-methane by nitrating to p,p'-diamino-diphenyl-methane and diazotizing the diamino-compound to 4,4'-dihydroxy-diphenyl-methane with a melting point of 158° C. in accordance with the literature. In rechecking for purity by the method dependent upon excess solute present in a solution, however, it was found that the product melting at 158° C. gave increased solubility as the amount of excess solid was increased, and this indicated an impure product. It was then discovered that, under the purification conditions of heat and solvent normally used, the product tended to revert to a lower melting mixture; but by crystallizing the impure product at room temperature from a solution in a mixture of toluene and butanol, followed by crystallization from pure toluene, a product was obtained with a melting point of 162°–163° C., or more exactly 162.26° C. This product when tested by the method of excess solids in benzene solution gave a constant solubility irrespective of the amount of excess solid phase present, thus establishing its purity.

The preparation of the 4,4' compound is disclosed by the following examples.

*Example 1.*—40 grams of diphenyl-methane were nitrated with excess nitric acid having a specific gravity of 1.42 at 50° C. The product was washed free of nitric acid, washed with ether, then dissolved in benzene, and crystallized. Crystals of a melting point of 182°–183.5° C. were obtained in the amount of 12.1 grams. The product was purified 4,4'-dinitro-diphenyl-methane.

64.1 grams of the 4,4'-dinitro-diphenyl-methane were reduced with iron and HCl in water and acetic acid solution at 100° C. The product was extracted with alcohol and distilled, yielding 31.2 grams boiling at 230°–240° C. at 5 mm. pressure. This was purified 4,4'-diamino-diphenyl-methane.

29 grams of the 4,4'-diamino-diphenyl-methane, boiling point 230°-240° C. at 5 mm., was treated with 21 grams NaNO₂ at 0° C. in the presence of 70 cc. H₂SO₄ and ice. The product was separated by filtration, dissolved in NaOH and precipitated by acid. The crystals were filtered off and dried. They were purified by distillation and melted at 158° C. Recrystallization from a series of single solvents gave 3.6 grams with melting point of 158° C.

This supposed pure product was impure by the method of solubility with excess solute present, and the residue from such solution was found to be slightly higher in melting point. By crystallizing at room temperature the impure sample from a mixture of toluene-butanol followed by a crystallization from pure toluene, a yield of 2.6 grams of material was obtained with a melting point of 162°-163° C. This when tested by the method of excess solutes was pure and remained constant.

Example 2.—Large quantities of the material were then made by the procedure of reacting phenol and formaldehyde in the presence of HCl catalyst, distilling the crystallizing fraction and recrystallizing to the 162°-163° C. purity material. The product was not depressed in melting point when mixed with the above standard. Furthermore the crystals, melting point 162°-163° C. and produced from phenol and formaldehyde, gave the same solubility irrespective of excess solute used, namely .001395 (±.000001 gram) per 1.0000 gram benzene at 25° C.

2,4'-dihydroxy-diphenyl-methane

The next problem was that of obtaining a proper standard for the 2,4' compound. For this purpose diphenyl-methane was nitrated to the 2,4'-dinitro compound, and purified; it was reduced to the 2,4'-diamino-diphenyl-methane which was diazotized to the dihydroxy product to yield crystals with a melting point of 116° C. Upon checking for purity, the crystals were found impure; but by extracting with a small amount of caustic and several recrystallizations from alcohol, crystals with a melting point of 119°-120° C. were recovered and were better than 99.5% pure by the excess solids method. Specific examples follow.

Example 3.—100 grams diphenyl-methane, 100 grams concentrated H₂SO₄ and 400 grams nitric acid having a density of 1.425, were held 24 hours at 20°-30° C. Poured into water, there was obtained 40 grams of a crude solid with a melting point of 178°-183° C. Recrystallization from benzene gave 22 grams with a melting point of 182°-183.5° C., and the product was the 4,4'-dinitro product.

The benzene mother liquor was concentrated to yield 90.1 grams crude 2,4'-dinitro-diphenyl-methane. When recrystallized, 76 grams with a melting point of 115°-118° C. were obtained, and reduction with iron and acetic acid gave 35.7 grams of the 2,4'-diamino-diphenyl-methane with a melting point of 86°-88° C. The product was diazotized in a mixture of 95 cc. water and 70 cc. H₂SO₄, and the liquid obtained was washed with water and distilled. When recrystallized at room temperature from benzene and butanol the product had a melting point of 119°-120° C. As a check, it was made into the diacetate and gave a material having a melting point of 72°-73.5° C., and this is the correct melting point for the diacetate of 2,4'-dihydroxy-diphenyl-methane.

Example 4.—In the reaction of phenol and formaldehyde with HCl as catalyst, the distillation of the crystalline fraction obtained gave a yield of a distillate at 210°-215° C. and 2 mm. pressure from which crystals with a melting point of 119°-120° C. were obtained from solution in butyl alcohol. These crystals when mixed with the above standard 2,4' isomer crystals gave no depression of the melting point, thus establishing them to be also 2,4' isomer crystals. The solubility was 0.00875±.00005 gram per gram of benzene at 25° C.

2,2'-dihydroxy-diphenyl-methane

From the washings and the mother liquor of the 2,4' material there were recovered some crystals (x) with a melting point of 119°-120° C. which when added to the pure 2,4' material depressed its melting point. The new material was found to be a pure isomer with the proper hydroxyl content and it was later determined to be the missing 2,2' isomer.

Example 5.—5 grams of the crystals with a melting point of 119°-120° C. were heated at atmospheric pressure by placing the distilling flask in an oil bath heated to 350° C. 3.8 grams of material were distilled through a short column leaving 1.1 grams of residue. The distillation point was determined as 315°-320° C. with some change of the product. From the distillate were isolated unchanged 2,2'-dihydroxy-diphenyl-methane and some caustic insoluble material. The latter was recrystallized to give crystals melting at 102°-103° C., and these, when mixed with a known sample made from xanthene, gave the same melting point of 102°-103° C.

Example 6.—A convenient method of preparing the 2,2' product was developed by taking xanthone, made from salicylic acid, and fusing it with caustic potash (KOH) to give the 2,2'-dihydroxy-benzo-phenone; this was reduced by hydrogen using copper chromite as a catalyst, to the 2,2'-dihydroxy-diphenyl-methane:

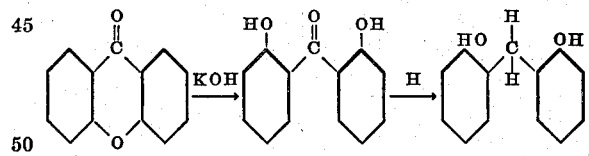

with a melting point of 119°-120° C. A mixture of these crystals and the crystals (x) above, gave no depression of the melting point. Numerous tests, such as making the dimethyl ether with a melting point of 62°-64° C. and the diacetate with a melting point of 47°-47.5° C. have proved the product to have the diortho-dihydroxy-diphenyl-methane structure with a molecular weight of 200; upon dehydration it yielded xanthene.

To be more specific, xanthone was made by the usual method from salicylic acid: to 15 grams were added 45 grams of molten KOH, and the mass was heated in air at 200°-230° C. The fusion was cooled, dissolved in water and acidified with HCl. The yellow precipitate was collected and dried with a yield of 14.6 grams of 2,2'-dihydroxy-benzo-phenone soluble in alcohol; it was melted with 2.7 grams of copper chromite catalyst at 175° C. and upon treatment with hydrogen at 2000 pounds pressure a pressure drop of 100 pounds was noted, showing hydrogen absorption. The product was dissolved in ether, and the catalyst removed by filtration; from this the phenolic portion was extracted with an alkali solution, acidified and extracted with ether, and the residue was distilled at 210° C. at 5 mm. pressure.

The distillate on crystallization from benzene was a product melting at 117.5°-120° C.; on dehydration it gave xanthene, thus proving its structure. The finally purified product melted at 119°-120° C., its diacetate at 47°-47.5° C., the dimethyl ether at 84°-84.5° C., dibenzyl ether at 65°-68° C., a bromo-derivative at 202°-203.5° C., and the dipropionate was liquid at room temperature.

Also xanthone was reduced to xanthene and when hydrolyzed by sodium and alcohol gave a small yield of crystals melting at 119°-120° C. When mixed with the crystals of Example 4, there was no depression of the melting point.

*Example 7.*—The diacetate of dihydroxy-benzo-phenone was produced by reaction with acetic anhydride, and the product when recrystallized from alcohol gave an 82% yield of crystals, melting at 95-96° C. in agreement with the literature; the derivative is proof of the structure involved. This known product was treated with copper chromite catalyst and hydrogen at 2500 pounds pressure at 175° C. for 5 hours, dissolved in alcohol and hydrolyzed with some excess of NaOH. The alkaline solution was distilled free from alcohol, dissolved in water and acidified; and the precipitate was crystallized from benzene to give a 25% yield of crystals with a melting crystals of Example 4, there was no depression of crystals of example 4, there was no depression of the melting point, and thus the 2,2' structure was established. Again the diethyl ether of the product melted at 84°-84.5° C., and it did not depress the melting point of the diethyl ether product of Example 5.

*Example 8.*—From a mixture of 184 grams of phenol to 80 grams (37.5%) aqueous formaldehyde, reacted for 34 hours without any added catalyst, a yield of 20 grams of crystals, melting at 119°-120° C., were obtained by extraction with benzene and recrystallization. A mixture of these crystals with those of Example 5 had the same melting point of 119°-120° C. When made into the acetate, crystals were formed melting at 47°-47.5° C., and these upon admixture with the acetate of the standard 2,2' isomer gave a mixed melting point of 47°-47.5° C.

The solubilities of the crystals produced by the foregoing Examples 5 to 8 were the same, namely, 0.03337(±0.00003) gram per 1.0 gram of benzene at 25° C., i. e., they were twenty times as soluble as the 4,4' isomer.

The 2,2' isomer under alkaline conditions is the least stable of the isomers, and it readily changes to a resinous mass upon heating; for instance, in the presence of 3% lime by weight of the crystalline product, the 2,2'-dihydroxy-diphenyl-methane resinified rapidly, while the 2,4' isomer was stable under these same conditions. It crystallizes from water in fine needles, being slightly soluble in water, and the crystals are very soluble in benzene, alcohol and acetone. The water-white crystals are sensitive to air-coloration in the presence of minute traces of alkali; on heating the boiling point and melting point are reduced by dehydration to xanthene and by isomerization, but at pressures below 5 mm. the product can be distilled with minor amounts of decomposition. The 2,2' isomer reacts with formaldehyde to give a heat-reactive type of resin; and upon blending with 25% of its weight of hexamethylene-tetramine, the mixture rapidly heat-hardens to an infusible resin. Molding compositions of constant properties can be made from the crystalline material, filler and hexamethylenetetramine for charging into molds; under pressures of about 1000 pounds per square inch such compositions have been molded within one minute at 150° C. The pure 4,4' and 2,4' crystals are also heat-hardenable when mixed with hexa or formaldehyde and useful for molding mixes and adhesives, but are less rapid in hardening than the 2,2' crystals.

*Group I isomers generally*

It is of interest to note that mixtures of the group I isomers can be recrystallized from many solvents without any change in proportion; and in certain proportions the mixtures have sharp melting points or of such a restricted range as to lead to the false conclusion of the mixtures being substantially pure products. Such conclusions apply particularly to the starred mixtures of the following table.

| Mixture percentage | Melting points, ° C. |
|---|---|
| 4,4'—90 : 2,4'—10 | 150-160 |
| 4,4'—75 : 2,4'—25 | 110-156 |
| 4,4'—50 : 2,4'—50 | 108-137 |
| 4,4'—25 : 2,4'—75 | 106-109* |
| 4,4'—10 : 2,4'—90 | 109-116 |
| 4,4'—90 : 2,2'—10 | 141-158 |
| 4,4'—75 : 2,2'—25 | 111-152 |
| 4,4'—50 : 2,2'—50 | 108-137 |
| 4,4'—25 : 2,2'—75 | 107-111* |
| 4,4'—10 : 2,2'—90 | 108-115 |
| 2,4'—90 : 2,2'—10 | 109-116 |
| 2,4'—75 : 2,2'—25 | 91-109 |
| 2,4'—50 : 2,2'—50 | 90-93* |
| 2,4'—25 : 2,2'—75 | 91-107 |
| 2,4'—10 : 2,2'—90 | 105-115 |

Resins were made from phenol and from the class I isomer crystals by reaction with formaldehyde and a trace of ammonia catalyst. The final ratio in each case was 1 mol of phenol ring to 1.5 formaldehyde mol. The time was taken for the reaction of the same amount of formaldehyde as established by the point of infusibility.

| Material | Time to gel at 100° C. | Relative speeds |
|---|---|---|
| | Minutes | |
| Phenol | 73 | 100 |
| 2,4' isomer | 78 | 94 |
| 4,4' isomer | 66 | 114 |
| 2,2' isomer | 9 | 810 |

Since the time of phenol reaction is approximately an average of half 2,4' and 4,4' isomers it seems to indicate that with ammonia catalyst the reaction goes through these stages of the 2,4' and 4,4' isomers as a major proportion. The reaction rate indicates that very little 2,2' isomer is present under these conditions.

The following tests establish reaction conditions which starting with phenol send the reaction through the 2,2' isomer. One mol of hydroxy-phenyl ring was in each case reacted with a final 1.5 mols of formaldehyde using as catalyst 1% by weight of zinc oxide.

| Material | Time to gel at 100° C. | Relative speeds |
|---|---|---|
| | Minutes | |
| Phenol | 18 | 100 |
| 2,4' isomer | 62 | 29 |
| 4,4' isomer | 58 | 32 |
| 2,2' isomer | 6 | 300 |

The resin made from phenol had evidently gone in part through the rapid 2,2' stage to arrive at a speed which, while not as rapid as pure 2,2', is three times as rapid as either the 4,4' or 2,4' isomers.

GROUP II ISOMERS

2,3'-dihydroxy-diphenyl-methane

This isomer, hitherto unknown, was prepared by reacting metahydroxy-benzaldehyde to the methoxy-ether and treating the product with an anisol. The product had a melting point of 95.5°–96° C.

Example 9.—60 grams of m-hydroxy-benzaldehyde were dissolved in water with 20 grams NaOH, and it was treated with 64 grams of dimethyl sulfate. The reaction mixture was extracted with ether and washed with dilute NaOH solution to remove phenols. The ether solution was dried and distilled, and the yield was 53 grams with a boiling point of 114°–116° C. at 15 mm. The product was dissolved in ether and was added to an ether reaction mixture of 12.9 grams magnesium and 93 grams ortho-bromanisol. The complex was decomposed by water and HCl, and the ether layer was distilled to give 98 grams of crude 2,3'-dimethoxy-benzohydrol (Ber., 41, 323).

The 2,3'-dimethoxy-benzohydrol was oxidized with $Na_2Cr_2O_7$ and $H_2SO_4$ in water and extracted with ether. After washing with NaOH solution, the ether solution was distilled; the yield was 60 grams, boiling point of 218°–222° C. at 12 mm. pressure; it was demethylated with $AlCl_3$ in benzene and gave the known 2,3'-dihydroxy-benzophenone with melting point of 126°–127° C. (this value agrees with the literature references). The product was reduced with amalgamated zinc, and a gradual addition of HCl over 5 hrs. gave a crystalline solid that when crystallized from benzene and then from water gave white crystals having a melting point of 95.5°–96° C. Its diacetate had a melting point of 43°–44° C. The crystalline material reacts rapidly with formaldehyde to give an infusible resin, no catalyst being needed.

3,3'-dihydroxy-diphenyl-methane

Meta-nitro-benzaldehyde was reduced to nitrobenzyl-alcohol which was condensed with nitrobenzene to obtain dimeta-dinitro-diphenyl-methane. This, when reduced and diazotized, gave white crystals with a melting point of 102°–103° C. that remained constant on purification.

Example 10.—61 grams m-nitro-benzyl-alcohol, 183 grams nitro-benzene, 1200 cc. concentrated $H_2SO_4$ were mixed and allowed to stand for 12 days then decomposed by ice. The precipitate was steam-distilled to free it from nitrobenzene, and it was then crystallized from acetic acid with a yield of 100 grams of crude 3,3'- dinitro-diphenyl-methane. The crystals were reduced with iron and acetic acid, evaporated to dryness, extracted with ether and dried over KOH to yield 40.7 grams of a product distilling at 240°–250° C. at 5 mm. It was diazotized and decomposed in water at 60°–70° C., then extracted with ether and washed with $NaHCO_3$ solution to remove colored products. The ether solution was dried and distilled to yield 10.1 grams distilling at 230°–240° C. at 3 mm.; this when recrystallized gave a white product with a melting point of 102°–103° C. The product reacted rapidly with formaldehyde either with or without catalysts, and it also reacted rapidly with a mixture of phenol and formaldehyde to give infusible resins.

3,4'-dihydroxy-diphenyl-methane

Meta-hydroxy-benzoic acid was changed to the methyl ether and this then changed to the acid chloride. The acid chloride was condensed with anisol and thus the caustic insoluble 3,4'-dimethoxy-benzo-phenone was produced. This then was hydrolyzed and reduced to the 3,4'-dihydroxy-diphenyl-methane and tested for molecular weight, hydroxyl content, derivatives, and constant solubility.

Example 11.—100 grams of m-hydroxy-benzoic acid was methylated with dimethyl-sulfate, using NaOH in water solution, excess NaOH was then added and the solution was boiled to hydrolize the methyl ester while the methyl ether remained stable; the yield was 100 grams of m-methoxy-benzoic acid, melting at 107°–109° C. It was treated with 330 grams thionyl chloride for 24 hours at room temperature after which the excess was removed by vacuum distillation. The yield of the acid chloride was 110 grams boiling at 118°–120° C. at 11 mm. It was dissolved in 65 cc. of tetrachlorethane and 85 grams anisol; the resulting complex was decomposed with ice and the excess solvent removed by steam. The product was dissolved in ether and washed with NaOH solution; and the residue from the ether was distilled to yield 132 grams boiling at 195°–200° C. at 1–3 mm. When crystallized, it melted at 56°–57° C. and was found to be 3,4'-dimethoxy-benzophenone. This was demethylated with $AlCl_3$ in benzene giving the known dihydroxy-benzophenone melting at 202°–203° C.

The phenone product was reduced with amalgamated zinc and dilute HCl to give crystals melting at 115°–116.5° C. of the 3,4'-dihydroxy-diphenyl-methane, molecular weight 200±2 and hydroxyl content 17.0%; the diacetate melted at 66°–67° C.

The excess solubility method used to establish the purity of such samples is of interest here. The sample in question was first purified by recrystallization until it gave a molecular weight of 200±2 by the boiling point method in acetone. Then it was checked for hydroxyl by the acetic anhydride method, using a little pyridine catalyst to make certain it contained no material other than these isomeric dihydroxy products; it gave a hydroxyl content of 17.0±0.1. The crystals were recrystallized from the same solvent to be used for solubility measurements, then the crystals were dried to constant weight. The dried crystals were suspended in known amounts of solvent using each time a different proportion of excess solid to the solvent; the solutions were made slightly above 25° C. and were cooled to equilibrium at 25° C. by weighing out samples until the solubility was found constant with time. The solutions were filtered free of excess solid crystals and the amount in solution per gram of solvent determined by driving off the solvent to constant weights of residue at 80°–85° C. The pure 3,4' gave the same solubility irrespective of amount of excess solid present.

What is claimed is:

1. A hydroxy-hydroxy'-diphenyl-methane having a hydroxyl on each of the phenyl rings in one of the positions ortho, meta and para to the methylene bond and characterized by a crystalline state of constant melting point and a constant solubility value when tested by the excess solute method.

2. A hydroxy-hydroxy'-diphenyl-methane having one hydroxyl on a phenyl ring in one of the positions ortho and para to the methylene bond and the other hydroxyl in one of the ortho and para positions on the second phenyl ring, said methane being derivable by the direct reaction of a phenol with a carbonyl organic compound selected from the class of aldehydes, ketones and derivatives engendering aldehydes and ketones in the reaction, and characterized by a crystalline state of constant melting point and a constant solubility value when tested by the excess solute method.

3. A hydroxy-hydroxy'-diphenyl-methane having a hydroxyl on each of the phenyl rings in the position ortho to the methylene bond, said methane being derivable by the direct reaction of phenol with formaldehyde, and characterized by a crystalline state of constant melting point and a constant solubility value when tested by the excess solute method.

4. 2,2'-hydroxy-hydroxy'-diphenyl-methane having a melting point of 118.5°–119.5° C. and reacting with 15 per cent by weight of hexamethylenetetramine to an infusible gel in approximately 60 seconds.

5. 2,3'-hydroxy-hydroxy'-diphenyl-methane having a melting point of 95.5°–96° C. and reacting with 15 per cent by weight of hexamethylenetetramine to an infusible gel in approximately 140 seconds.

6. 3,4'-hydroxy-hydroxy'-diphenyl-methane having a melting point of 116°–116.5° C. and reacting with 15 per cent by weight of hexamethylenetetramine to an infusible gel in approximately 130 seconds.

7. Process of obtaining in a pure form a hydroxy-hydroxy'-diphenyl-methane characterized by a hydroxyl in one of the positions ortho and para to the methylene bond and the other hydroxyl in one of the ortho and para positions on the second ring which comprises reacting phenol and formaldehyde in the presence of an acidic catalyst, distilling off the crystallizing fraction, and recrystallizing at normal temperature from solution until an excess of solute causes no change in the solubility value.

8. Process of preparing in a pure form a 2,2'-hydroxy-hydroxy'-diphenyl-methane which comprises fusing xanthone with caustic potash, reducing the product with hydrogen, extracting and precipitating the phenolic portion, distilling the residue, and crystallizing the distillate from benzene.

HOWARD L. BENDER.
ALFORD G. FARNHAM.
JOHN W. GUYER.

REFERENCES CITED

The following references are of record in the file of this patent:

UNITED STATES PATENTS

| Number | Name | Date |
|---|---|---|
| 1,088,677 | Baekeland | Mar. 3, 1914 |
| 1,614,171 | Amann | Jan. 11, 1927 |

OTHER REFERENCES

Losev: "Jour. Gen. Chem.," U. S. S. R., 7 pp. 1828–34 (1937), abstracted in Chem. Abst., vol. 32, column 530 (1938).

Seebach: "Kunststaffe," 27 pp. 287–90 (1937), abstracted in Chem. Abst., vol. 32, col. 1009 (1938).

Sugimoto: "Repts. Osaka Imp. Ind. Research Lab. Japan," 11 No. 2 (1930), abstracted in Chem. Abst., 25 pp. 3322–3 (1931).

Kruber: "Berichte," 74B, pp. 6193–6 (1941).

Thorp's Dictionary of Applied Chemistry, 1921, vol. II, pages 431–432, the article on Crystallization.

Hougen and Watson: "Chemical Process Principles," part one, 1943, page 123.

Buhler: "Jour. Organic Chem.," 8, 316 (1943).

Certificate of Correction

Patent No. 2,464,207.

March 15, 1949.

HOWARD L. BENDER ET AL.

It is hereby certified that errors appear in the printed specification of the above numbered patent requiring correction as follows:

Column 5, lines 43 and 44, in the heading to the table, fourth column thereof, for "Diethyl ther" read *Diethyl ether*; column 11, line 31, Example 7, strike out "crystals of Example 4, there was no depression of" and insert instead *point of 118.5°–119.5° C. When mixed with the*;

and that the said Letters Patent should be read with these corrections therein that the same may conform to the record of the case in the Patent Office.

Signed and sealed this 13th day of September, A. D. 1949.

[SEAL]

JOE E. DANIELS,
*Assistant Commissioner of Patents.*